US006391391B2

(12) United States Patent
Barkac et al.

(10) Patent No.: US 6,391,391 B2
(45) Date of Patent: May 21, 2002

(54) COATING SUBSTRATE WITH ATOM TRANSFER RADICAL POLYMERIZED CARBOXYL POLYMER AND POLYEPOXIDE

(75) Inventors: Karen A. Barkac, Murrysville; Simion Coca, Pittsburgh; James R. Franks, Gibsonia; Kurt A. Humbert, Bethel Park; Paul H. Lamers, Allison Park; Roxalana L. Martin, Pittsburgh; James B. O'Dwyer, Valencia; Kurt G. Olson, Gibsonia; Daniela White, Pittsburgh, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/855,370

(22) Filed: May 15, 2001

Related U.S. Application Data

(62) Division of application No. 09/375,017, filed on Aug. 16, 1999, now Pat. No. 6,265,489.
(60) Provisional application No. 60/098,603, filed on Aug. 31, 1998.

(51) Int. Cl.$^7$ .......................... B05D 3/02; C08L 33/02; C08L 51/00; C08L 53/00; C08L 63/06
(52) U.S. Cl. ........................................ 427/386
(58) Field of Search ................. 525/65, 92 H, 525/94, 119, 111, 208, 92 F; 427/386

(56) References Cited

U.S. PATENT DOCUMENTS

| | | | |
|---|---|---|---|
| 3,935,138 A | 1/1976 | Wingler et al. | 260/17 R |
| 4,147,679 A | 4/1979 | Scriven et al. | 260/29.2 TN |
| 4,220,679 A | 9/1980 | Backhouse | 427/401 |
| 4,242,253 A | 12/1980 | Yallourakis | 260/40 TN |
| 4,403,003 A | 9/1983 | Backhouse | 427/407.1 |
| 4,605,710 A | 8/1986 | Guilbert | 525/438 |
| 4,910,287 A | 3/1990 | McLafferty et al. | 528/272 |
| 5,071,904 A | 12/1991 | Martin et al. | 524/458 |
| 5,264,529 A | 11/1993 | Nozaki et al. | 525/438 |
| 5,468,813 A | 11/1995 | Uenaka et al. | 525/385 |
| 5,684,067 A | 11/1997 | Muthiah et al. | 523/453 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,945,487 A | 8/1999 | Ohkoshi et al. | 525/327.3 |
| 6,071,980 A | 6/2000 | Guan et al. | 522/66 |

FOREIGN PATENT DOCUMENTS

| | | |
|---|---|---|
| JP | 49-31753 A | 3/1974 |
| JP | 54-127439 A | 10/1979 |
| WO | WO 98/40415 | 9/1998 |

*Primary Examiner*—Robert E. L. Sellers
(74) *Attorney, Agent, or Firm*—William J. Uhl

(57) ABSTRACT

A thermosetting composition comprising a co-reactable solid, particulate mixture of (a) polycarboxylic acid functional polymer, and (b) epoxide functional crosslinking agent having at least two epoxide groups, e.g., triglycidyl isocyanurate (TGIC), is described. The polycarboxylic acid functional polymer is prepared by atom transfer radical polymerization and has well defined polymer chain architecture and polydispersity index of less than 2.0. The thermosetting compositions of the present invention have utility as powder coatings compositions.

24 Claims, No Drawings

US 6,391,391 B2

COATING SUBSTRATE WITH ATOM TRANSFER RADICAL POLYMERIZED CARBOXYL POLYMER AND POLYEPOXIDE

CROSS-REFERENCE TO RELATED APPLICATION

This application is a Division of U.S. patent application Ser. No. 09/375,017 filed Aug. 16, 1999, U.S. Pat. No. 6,265,489, benefit of U.S. Provisional Application Ser. No. 60/098,603, filed Aug. 31, 1998, both of which applications are hereby incorporated by reference in their entirety.

FIELD OF THE INVENTION

The present invention relates to thermosetting compositions of one or more carboxylic acid functional polymers and an epoxide functional crosslinking agent, such as tris (2,3-epoxypropyl) isocyanurate. The carboxylic acid functional polymer is prepared by atom transfer radical polymerization, and has well defined polymer chain structure, molecular weight and molecular weight distribution. The present invention also relates to methods of coating a substrate, and substrates coated by such methods.

BACKGROUND OF THE INVENTION

Reducing the environmental impact of coatings compositions, in particular that associated with emissions into the air of volatile organics during their use, has been an area of ongoing investigation and development in recent years. Accordingly, interest in powder coatings has been increasing due, in part, to their inherently low volatile organic content (VOC), which significantly reduces air emissions during the application process. While both thermoplastic and thermoset powder coatings compositions are commercially available, thermoset powder coatings are typically more desirable because of their superior physical properties, e.g., hardness and solvent resistance.

Low VOC coatings are particularly desirable in a number of applications, e.g., the automotive original equipment manufacture (OEM), industrial and appliance markets, due to the relatively large volume of coatings that are used. However, in addition to the requirement of low VOC levels, many manufactures have strict performance requirements of the coatings that are used. Examples of such requirements include, good exterior durability, solvent resistance, and excellent gloss and appearance. While liquid topcoats can provide such properties, they have the undesirable draw back of higher VOC levels relative to powder coatings, which have essentially zero VOC levels.

Powder coatings based on carboxylic acid functional polymers cured with epoxide functional crosslinkers, such as tris(2,3-epoxypropyl) isocyanurate, ("epoxy cured powder coatings") are known and have been developed for use in a number of applications, such as industrial and automotive OEM topcoats. The epoxide functional crosslinker tris(2,3-epoxypropyl) isocyanurate is also commonly referred to as triglycidyl isocyanurate (TGIC). Such epoxy cured powder coatings, in which the crosslinking agent is TGIC, are described in, for example, U.S. Pat. Nos. 3,935, 138, 4,242,253, 4,605,710, 4,910,287, 5,264,529 and 5,684, 067. However, their use has been limited due to deficiencies in, for example, flow, appearance and storage stability. The binder of epoxy cured powder coatings compositions typically comprises polyester and/or acrylic polymers having carboxylic acid functionality. The carboxylic acid functional polymers used in such epoxy cured powder coatings compositions are typically prepared by standard, i.e., non-living, radical polymerization methods, which provide little control over molecular weight, molecular weight distribution and polymer chain structure.

The physical properties, e.g., glass transition temperature (Tg) and melt viscosity, of a given polymer can be directly related to its molecular weight. Higher molecular weights are typically associated with, for example, higher Tg values and melt viscosities. The physical properties of a polymer having a broad molecular weight distribution, e.g., having a polydispersity index (PDI) in excess of 2.0 or 2.5, can be characterized as an average of the individual physical properties of and indeterminate interactions between the various polymeric species that comprise it. As such, the physical properties of polymers having broad molecular weight distributions can be variable and hard to control.

The polymer chain structure, or architecture, of a copolymer can be described as the sequence of monomer residues along the polymer back bone or chain. For example, a carboxylic acid functional copolymer prepared by standard radical polymerization techniques will contain a mixture of polymer molecules having varying individual carboxylic acid equivalent weights. Some of these polymer molecules can actually be free of carboxylic acid functionality. In a thermosetting composition, the formation of a three dimensional crosslinked network is dependent upon the functional equivalent weight as well as the architecture of the individual polymer molecules that comprise it. Polymer molecules having little or no reactive functionality (or having functional groups that are unlikely to participate in crosslinking reactions due to their location along the polymer chain) will contribute little or nothing to the formation of the three dimensional crosslink network, resulting in less than desirable physical properties of the finally formed polymerizate, e.g., a cured or thermoset coating.

The continued development of new and improved epoxy cured powder coatings compositions having essentially zero VOC levels and a combination of favorable performance properties is desirable. In particular, it would be desirable to develop epoxy cured powder coatings compositions that comprise carboxylic acid functional polymers having well defined molecular weights and polymer chain structure, and narrow molecular weight distributions, e.g., PDI values less than 2.5. Controlling the architecture and polydispersity of the carboxylic acid functional polymer is desirable in that it enables one to achieve higher Tg's and lower melt viscosities than comparable carboxylic acid functional polymers prepared by conventional processes, resulting in thermosetting particulate compositions which are resistant to caking and have improved physical properties.

International patent publication WO 97/18247 and U.S. Pat. Nos. 5,763,548 and 5,789,487 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '548 and '487 patents and WO 97/18247 patent publication also describe (co)polymers prepared by ATRP, which are useful in a wide variety of applications, for example, with paints and coatings.

SUMMARY OF THE INVENTION

In accordance with the present invention there is provided, a thermosetting composition comprising a co-reactable solid, particulate mixture of:

(a) polycarboxylic acid functional polymer prepared by atom transfer radical polymerization initiated in the presence of an initiator having at least one radically transferable group, and in which said polymer contains at least one of the following polymer chain structures I and II:

$$—[(M)_p—(G)_q]_x—$$ I and $$—[(G)_q—(M)_p]_x—$$ II wherein M is a residue, that is free of carboxylic acid functionality, of at least one ethylenically unsaturated radically polymerizable monomer; G is a residue, that has carboxylic acid functionality, of at least one ethylenically unsaturated radically polymerizable monomer; p and q represent average numbers of residues occurring in a block of residues in each polymer chain structure; and p, q and x are each individually selected for each structure such that said polycarboxylic acid functional polymer has a number average molecular weight of at least 250; and (b) epoxide functional crosslinking agent having at least two epoxide groups.

In accordance with the present invention, there is also provided a method of coating a substrate with the above described thermosetting composition.

There is further provided, in accordance with the present invention, a multi-component composite coating composition comprising a base coat deposited from a pigmented film-forming composition, and a transparent top coat applied over the base coat. The transparent top coat comprises the above described thermosetting composition.

Other than in the operating examples, or where otherwise indicated, all numbers expressing quantities of ingredients, reaction conditions, and so forth used in the specification and claims are to be understood as modified in all instances by the term "about."

As used herein, the term "polymer" is meant to refer to both homopolymers, i.e., polymers made from a single monomer species, and copolymers, i.e., polymers made from two or more monomer species.

DETAILED DESCRIPTION OF THE INVENTION

Thermosetting compositions in accordance with the present invention, comprise one or more polycarboxylic acid functional polymers. As used herein and in the claims, by "polycarboxylic acid functional polymer" and like terms is meant a polymer having two or more carboxylic acid groups in terminal and/or pendent positions that are capable of reacting and forming covalent bonds with compounds containing epoxide (or oxirane) groups.

The carboxylic acid functional polymer of the present invention is prepared by atom transfer radical polymerization (ATRP). The ATRP method is described as a "living polymerization," i.e., a chain-growth polymerization that propagates with essentially no chain transfer and essentially no chain termination. The molecular weight of a polymer prepared by ATRP can be controlled by the stoichiometry of the reactants, i.e., the initial concentration of monomer(s) and initiator(s). In addition, ATRP also provides polymers having characteristics including, for example, narrow molecular weight distributions, e.g., PDI values less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and isolating the formed polymer. The initiation system comprises: an initiator having a radically transferable atom or group; a transition metal compound, i.e., a catalyst, which participates in a reversible redox cycle with the initiator; and a ligand, which coordinates with the transition metal compound. The ATRP process is described in further detail in international patent publication WO 97/18247 and U.S. Pat. Nos. 5,763,548 and 5,789,487.

In preparing carboxylic acid functional polymers of the present invention, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiator may also be substituted with functional groups, e.g., oxyranyl groups, such as glycidyl groups. Additional useful initiators and the various radically transferable groups that may be associated with them are described on pages 42 through 45 of international patent publication WO 97/18247.

Polymeric compounds (including oligomeric compounds) having radically transferable groups may be used as initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy) ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found on pages 31 through 38 of international patent publication WO 98/01480.

Preferably, the initiator may be selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(a-halo-$C_1$–$C_6$-alkyl) benzene, diethyl-2-halo-2-methyl malonate, ethyl 2-bromoisobutyrate and mixtures thereof. A particularly preferred initiator is diethyl-2-bromo-2-methyl malonate.

Catalysts that may be used in preparing carboxylic acid functional polymers of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula III, $$TM^{n+}X_n$$ III wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halogen, hydroxy, oxygen, $C_1$–$C_6$-alkoxy, cyano, cyanato, thiocyanato and azido. A preferred transition metal is Cu(I) and X is preferably halogen, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)Cl$_2$ when Cu(I)Cl is used. Additional catalysts useful in preparing the carboxylic acid functional polymers of the present invention are described on pages 45 and 46 of international patent publication WO 97/18247. Redox conjugates are described on pages 27 through 33 of international patent publication WO 97/18247.

Ligands that may be used in preparing carboxylic acid functional polymers of the present invention, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkylbipyridyls. Additional ligands that may be used in preparing the carboxylic acid functional polymers of the present invention are described on pages 46 through 53 of international patent publication WO 97/18247.

In preparing the carboxylic acid functional polymers of the present invention the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the carboxylic acid functional polymer can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5\times10^{-2}$: 1.

In preparing the carboxylic acid functional polymers of the present invention, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

Carboxylic acid functional polymers useful in the thermosetting compositions of the present invention may be prepared in the absence of solvent, i.e., by means of a bulk polymerization process. Generally, the carboxylic acid functional polymer is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, and mixed aromatic solvents such as those commercially available from Exxon Chemical America under the trademark SOLVESSO. Additional solvents are described in further detail on pages 53 through 56 of international patent publication WO 97/18247.

Due to the possible deactivation of some ATRP catalysts, e.g., copper, in the presence of carboxylic acid groups, the above described ATRP process is generally performed in the substantial absence of carboxylic acid functionality. Accordingly, the carboxylic acid functional polymer used in the composition of the present invention is typically prepared in two stages. The first stage involves the ATRP preparation of a precursor of the polycarboxylic acid functional polymer that is substantially free of carboxylic acid functionality ("precursor polymer"). In the second stage, the precursor polymer is converted to the polycarboxylic acid functional polymer of the composition of the present invention.

The conversion of the precursor polymer to the polycarboxylic acid functional polymer is accomplished using methods known to those of ordinary skill in the art. Such known methods of conversion include, but are not limited to: (a) hydrolyzing residues of alkyl (meth)acrylate monomers, e.g., t-butyl methacrylate, present in the backbone of the precursor polymer; and (b) reacting residues of hydroxy functional ethylenically unsaturated radically polymerizable monomers present in the backbone of the precursor polymer with cyclic anhydrides, e.g., succinic anhydride.

The precursor polymer of the carboxylic acid functional polymer is typically prepared at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

When the carboxylic acid functional polymer is prepared in the presence of a solvent, the solvent is removed after the polymer has been formed, by appropriate means as are known to those of ordinary skill in the art, e.g., vacuum distillation. Alternatively, the polymer may be precipitated out of the solvent, filtered, washed and dried according to known methods. After removal of, or separation from, the solvent, the carboxylic acid functional polymer typically has a solids (as measured by placing a 1 gram sample in a 110° C. oven for 60 minutes) of at least 95 percent, and preferably at least 98 percent, by weight based on total polymer weight.

Prior to use in the thermosetting compositions of the present invention, the ATRP transition metal catalyst and its associated ligand are typically separated or removed from the carboxylic acid functional polymer. The ATRP catalyst is preferably removed prior to conversion of the precursor polymer to the carboxylic acid functional polymer. Removal of the ATRP catalyst is achieved using known methods, including, for example, adding a catalyst binding agent to the a mixture of the precursor polymer, solvent and catalyst, followed by filtering. Examples of suitable catalyst binding agents include, for example, alumina, silica, clay or a combination thereof. A mixture of the precursor polymer, solvent and ATRP catalyst may be passed through a bed of catalyst binding agent. Alternatively, the ATRP catalyst may be oxidized in situ and retained in the precursor polymer.

The carboxylic acid functional polymer may be selected from the group consisting of linear polymers, branched polymers, hyperbranched polymers, star polymers, graft polymers and mixtures thereof. The form, or gross architecture, of the polymer can be controlled by the choice of initiator and monomers used in its preparation. Linear carboxylic acid functional polymers may be prepared by using initiators having one or two radically transferable groups, e.g., diethyl-2-halo-2-methyl malonate and α,α'-dichloroxylene. Branched carboxylic acid functional polymers may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis (methacrylate). Hyperbranched carboxylic acid functional polymers may be prepared by increasing the amount of branching monomer used.

Star carboxylic acid functional polymers may be prepared using initiators having three or more radically transferable groups, e.g., hexakis(bromomethyl)benzene. As is known to those of ordinary skill in the art, star polymers may be prepared by core-arm or arm-core methods. In the core-arm method, the star polymer is prepared by polymerizing monomers in the presence of the polyfunctional initiator, e.g., hexakis(bromomethyl)benzene. Polymer chains, or arms, of similar composition and architecture grow out from the initiator core, in the core-arm method.

In the arm-core method, the arms are prepared separately from the core and optionally may have different compositions, architecture, molecular weight and PDI's. The arms may have different carboxylic acid equivalent weights, and some may have no carboxylic acid functionality. After the preparation of the arms, they are attached to the core. For example, the arms may be prepared as precursor polymers by ATRP using glycidyl functional initiators. These arms are then attached to a core having three or more active hydrogen groups that are reactive with epoxides, e.g., carboxylic acid or hydroxyl groups. Finally, the precursor polymer arms of the formed star polymer are converted to carboxylic acid functional arms, as discussed previously herein. The core can be a molecule, such as citric acid, or a core-arm star polymer prepared by ATRP and having terminal reactive hydrogen containing groups, e.g., carboxylic acid, thiol or hydroxyl groups.

An example of a core prepared by ATRP methods that can be used as a core in an ATRP arm-core star polymer is described as follows. In the first stage, 6 moles of methyl methacrylate are polymerized in the presence of one mole of 1,3,5-tris(bromomethyl)benzene. In the second stage 3 moles of 2-hydroxyethyl methacrylate are fed to the reaction mixture. The core having terminal residues of 2-hydroxyethyl methacrylate is isolated and then in the third stage reacted with a cyclic anhydride, such as succinic anhydride. In the next stage, three precursor polymer arms of varying or equivalent composition and at least one of which has been prepared by ATRP, are connected to the carboxylic acid terminated core by reaction between the carboxylic acid groups of the core and reactive functionality in the arms, e.g., epoxide groups. The attached precursor polymer arms of the star polymer are then converted to carboxylic acid functional arms.

Carboxylic acid functional polymers in the form of graft polymers may be prepared using a macroinitiator, as previously described herein. Graft, branched, hyperbranched and star polymers are described in further detail on pages 79 through 91 of international patent publication WO 97/18247.

The polydispersity index (PDI) of carboxylic acid functional polymers useful in the present invention, is typically less than 2.5, more typically less than 2.0, and preferably less than 1.8, for example, 1.5. As used herein, and in the claims, "polydispersity index" is determined from the following equation: (weight average molecular weight (Mw)/ number average molecular weight (Mn)). A monodisperse polymer has a PDI of 1.0. Further, as used herein, Mn and Mw are determined from gel permeation chromatography using polystyrene standards.

General polymer chain structures I and II together or separately represent one or more structures that comprise the polymer chain, or back bone, architecture of the carboxylic acid functional polymer. Subscripts p and q of general polymer chain structures I and II represent average numbers of residues occurring in the M and G blocks of residues respectively. Subscript x represents the number of segments of M and G blocks, i.e., x-segments. Subscripts p and q may each be the same or different for each x-segment. The following are presented for the purpose of illustrating the various polymer architectures that are represented by general polymer chain structures I and II.

Homoblock Polymer Architecture:

When x is 1, p is 0 and q is 5, general polymer chain structure I represents a homoblock of 5 G residues, as more specifically depicted by the following general formula IV.

—(G)—(G)—(G)—(G)—(G)— IV

Diblock Copolymer Architecture:

When x is 1, p is 5 and q is 5, general polymer chain structure I represents a diblock of 5 M residues and 5 G residues as more specifically depicted by the following general formula V.

—(M)—(M)—(M)—(M)—(M)—(G)—(G)—(G)—(G)—(G)— V

Alternating Copolymer Architecture:

When x is greater than 1, for example, 5, and p and q are each 1 for each x-segment, polymer chain structure I represents an alternating block of M and G residues, as more specifically depicted by the following general formula VI.

—(M)—(G)—(M)—(G)—(M)—(G)—(M)—(G)—(M)—(G)— VI

Gradient Copolymer Architecture:

When x is greater than 1, for example, 3, and p and q are each independently within the range of, for example, 1 to 3, for each x-segment, polymer chain structure I represents a gradient block of M and G residues, as more specifically depicted by the following general formula VII.

—(M)—(M)—(M)—(G)—(M)—(M)—(G)—(G)—(M)—(G)—
(G)—(G)— VII

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer feed containing monomers having different rates of polymerization, or (c) a combination of (a) and (b). Gradient copolymers are described in further detail on pages 72 through 78 of international patent publication WO 97/18247.

With further reference to general polymer chain structures I and II, M represents one or more types of residues that are free of carboxylic acid functionality, and p represents the average total number of M residues occurring per block of M residues (M-block) within an x-segment. The —$(M)_p$— portion of general structures I and II represents (1) a homoblock of a single type of M residue, (2) an alternating block of two types of M residues, (3) a polyblock of two or more types of M residues, or (4) a gradient block of two or more types of M residues.

For purposes of illustration, when the M-block is prepared from, for example, 10 moles of methyl methacrylate, the —$(M)_p$— portion of structures I and II represents a homoblock of 10 residues of methyl methacrylate. In the case where the M-block is prepared from, for example, 5 moles of methyl methacrylate and 5 moles of butyl methacrylate, the —(M)$_p$— portion of general structures I and II represents, depending on the conditions of preparation, as is known to one of ordinary skill in the art: (a) a diblock of 5 residues of methyl methacrylate and 5 residues of butyl methacrylate having a total of 10 residues (i.e., p =10); (b) a diblock of 5 residues of butyl methacrylate and 5 residues of methyl methacrylate having a total of 10 residues; (c) an alternating block of methyl methacrylate and butyl methacrylate residues beginning with either a residue of methyl methacrylate or a residue of butyl methacrylate, and having a total of 10 residues; or (d) a gradient block of methyl methacrylate and butyl methacrylate residues beginning with either residues of methyl methacrylate or residues of butyl methacrylate having a total of 10 residues.

Also, with reference to general polymer chain structures I and II, G represents one or more types of residues that have carboxylic acid functionality, and q represents the average total number of G residues occurring per block of G residues (G-block). Accordingly, the —(G)$_q$— portions of polymer chain structures I and II may be described in a manner similar to that of the —(M)$_p$— portions provided above.

Residue M of general polymer chain structures I and II is derived from at least one ethylenically unsaturated radically polymerizable monomer. As used herein and in the claims, "ethylenically unsaturated radically polymerizable monomer" and like terms are meant to include vinyl monomers, allylic monomers, olefins and other ethylenically unsaturated monomers that are radically polymerizable.

Classes of vinyl monomers from which M may be derived include, but are not limited to, (meth)acrylates, vinyl aromatic monomers, vinyl halides and vinyl esters of carboxylic acids. As used herein and in the claims, by "(meth) acrylate" and like terms is meant both methacrylates and acrylates. Preferably, residue M is derived from at least one of alkyl (meth)acrylates having from 1 to 20 carbon atoms in the alkyl group. Specific examples of alkyl (meth) acrylates having from 1 to 20 carbon atoms in the alkyl group from which residue M may be derived include, but are not limited to, methyl (meth)acrylate, ethyl (meth)acrylate, propyl (meth)acrylate, isopropyl (meth)acrylate, butyl (meth)acrylate, isobutyl (meth)acrylate, tert-butyl (meth) acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate.

Residue M may also be selected from monomers having more than one (meth)acrylate group, for example, (meth) acrylic anhydride and diethyleneglycol bis((meth)acrylate). Residue M may also be selected from alkyl (meth)acrylates containing radically transferable groups, which can act as branching monomers, for example, 2-(2-bromopropionoxy) ethyl acrylate.

Specific examples of vinyl aromatic monomers from which M may be derived include, but are not limited to, styrene, p-chloromethylstyrene, divinyl benzene, vinyl naphthalene and divinyl naphthalene. Vinyl halides from which M may be derived include, but are not limited to, vinyl chloride and vinylidene fluoride. Vinyl esters of carboxylic acids from which M may be derived include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which M may be derived include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula VIII,

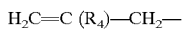

$$H_2C=C(R_4)-CH_2-$$  VIII wherein $R_4$ is hydrogen, halogen or a $C_1$ to $C_4$ alkyl group. Most commonly, $R_4$ is hydrogen or methyl and consequently general formula VIII represents the unsubstituted (meth) allyl radical. Examples of allylic monomers include, but are not limited to: (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which M may be derived include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; and diesters of ethylenically unsaturated dibasic acids, e.g., diethyl maleate.

Residue G of general polymer chain structures I and II is typically derived from: alkyl (meth)acrylate, which after polymerization is hydrolyzed; or at least one hydroxy functional ethylenically unsaturated radically polymerizable monomer, which after polymerization is post-reacted with a cyclic anhydride. Examples of classes of suitable hydroxy functional ethylenically unsaturated radically polymerizable monomers from which residue G may be derived include, but are not limited to: vinyl esters such as vinyl acetate, which are hydrolyzed to residues of vinyl alcohol after polymerization; allylic esters such as allyl acetate, which are hydrolyzed to residues of allyl alcohol after polymerization; allylic functional monomer that also have hydroxy functionality, e.g., allyl alcohol and 2-allylphenol; vinyl aromatic monomers having hydroxy functionality, e.g., 2-ethenyl-5-methyl phenol, 2-ethenyl-6-methyl phenol and 4-ethenyl-3-methyl phenol; and hydroxy functional (meth) acrylates such as hydroxyalkyl (meth)acrylates, e.g., hydroxyethyl (meth)acrylate and hydroxypropyl (meth) acrylate.

The cyclic anhydride is selected from those which can react with residues of the hydroxy functional ethylenically unsaturated radically polymerizable monomers in the precursor polymer backbone, thereby attaching carboxylic acid groups thereto. Examples of suitable cyclic anhydrides include, but are not limited to, succinic anhydride, maleic anhydride, glutaric anhydride, adipic anhydride and pimelic anhydride.

In a preferred embodiment of the present invention, residue G is derived from: $C_1$–$C_4$ alkyl (meth)acrylate, e.g., t-butyl methacrylate, which after polymerization is hydrolyzed; or at least one of hydroxyethyl (meth)acrylate and hydroxypropyl (meth)acrylate, which after polymerization is post-reacted with a cyclic anhydride, e.g., succinic anhydride.

Residue G may also be derived from other monomers which can be converted or further reacted with other compounds to provide acid functionality after completion of the ATRP polymerization process. Examples of such other monomers from which residue G may be derived include, but are not limited to: acrylonitrile, the nitrile portion of which can be hydrolyzed to a carboxylic acid group after polymerization; isocyanate functional monomers, e.g., 3-isopropenyl-α,α-dimethylbenzyl isocyanate [chemical abstracts (CAS) registry number 2094-99-7], which can be reacted after polymerization with compounds containing both carboxylic acid and hydroxyl functionality, e.g., 12-hydroxystearic acid and lactic acid; and maleic anhydride, which after polymerization can be either hydrolyzed to form carboxylic acid groups or reacted with a monofunctional alcohol in the presence of acid catalyst to form ester and carboxylic acid groups.

The choice of monomers from which each of residues M and G are selected is interrelated, i.e., the choice of monomers from which G is derived limits the choice of monomers from which M is derived. When residue G is derived from hydroxy functional ethylenically unsaturated radically polymerizable monomer(s), which after polymerization are post-reacted with a cyclic anhydride, residue M is typically not derived from such monomer(s). Also, when residue G is derived from one or more alkyl (meth)acrylates, which after polymerization are hydrolyzed, residue M is typically not derived from such monomers.

Subscripts p and q represent average number of residues occurring in a block of residues in each polymer structure. Typically, p and q each independently have a value of 0 or more, preferably at least 1, and more preferably at least 5 for each of general polymer structures I and II. Also, subscripts p and q each independently have a value of typically less than 100, preferably less than 20, and more preferably less than 15 for each of general polymer structures I and II. The values of subscripts p and q may range between any combination of these values, inclusive of the recited values. Moreover, the sum of p and q is at least 1 within an x-segment and q is at least 1 within at least one x-segment in the polymer.

Subscript x of general polymer structures I and II typically has a value of at least 1. Also, subscript x typically has a value of less than 100, preferably less than 50, and more preferably less than 10. The value of subscript x may range between any combination of these values, inclusive of the recited values. If more than one of the structures I and/or II occur in the polymer molecule, x may have different -values for each structure (as may p and q), allowing for a variety of polymer architectures such as gradient copolymers.

The polycarboxylic acid functional polymer of the present invention may be further described as having at least one of the following general polymer chain structures IX and X:

    IX and

    X wherein p, q, x, M and G have the same meanings as previously described herein. The subscripts r and s represent average numbers of residues occurring in the respective blocks of M and G residues. The —(M)$_r$— and —(G)$_s$— portions of general formulas IX and X have meanings similar to those as previously described herein with regard to portions —(M)$_p$— and —(G)$_q$— General polymer chain structures IX and X can represent the polymer itself or, alternatively, each of the structures can comprise a terminal segment of the polymer. For example, where z is 1, the structures IX and X can represent a linear polymer, prepared by ATRP using an initiator having 1 radically transferable group. Where z is 2, the structures IX and X can represent a linear "leg" extending from the residue of an initiator having 2 radically transferable groups. Alternatively, where z is greater than 2, the structures IX and X can each represent an "arm" of a star polymer prepared by ATRP, using an initiator having more than 2 radically transferable groups.

Symbol φ of general formulas IX and X is or is derived from the residue of the initiator used in the ATRP preparation of the polymer, and is free of the radically transferable group of the initiator. For example, when the carboxylic acid functional polymer is initiated in the presence of benzyl bromide, the symbol φ, more specifically φ-, is the benzyl residue,

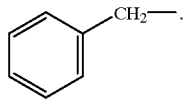

The symbol φ may also be derived from the residue of the initiator. For example, when the carboxylic acid functional polymer is initiated using epichlorohydrin the symbol φ, more

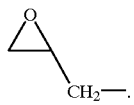

specifically φ-, is the 2,3-epoxy-propyl residue, The 2,3-epoxy-propyl residue can then be converted to, for example, a 2,3-dihydroxypropyl residue.

In general formulas IX and X, subscript z is equal to the number of carboxylic acid functional polymer chains that are attached to φ. Subscript z is at least 1 and may have a wide range of values. In the case of comb or graft polymers, wherein φ is a macroinitiator having several pendent radically transferable groups, z can have a value in excess of 10, for example 50, 100 or 1000. Typically, z is less than 10, preferably less than 6 and more preferably less than 5. In a preferred embodiment of the present invention, z is 1 or 2.

Symbol T of general formulas IX and X is or is derived from the radically transferable group of the initiator. For example, when the carboxylic acid functional polymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, e.g., an alkali metal alkoxylate. However, in the present invention, it is desirable that the method by which the radically transferable group is either removed or chemically converted, also be relatively mild, i.e., not appreciably affecting or damaging the polymer backbone.

In a preferred embodiment of the present invention, when the radically transferable group is a halogen, the halogen can be removed by means of a mild dehalogenation reaction. The reaction is typically performed as a post-reaction after the precursor polymer has been formed, i.e., prior to conversion of the precursor polymer to the polycarboxylic acid functional polymer, and in the presence of at least an ATRP catalyst. Preferably, the dehalogenation post-reaction is performed in the presence of both an ATRP catalyst and its associated ligand.

The mild dehalogenation reaction is performed by contacting the halogen terminated precursor of the carboxylic acid acid functional polymer of the present invention that is substantially free of carboxylic acid functionality with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound(s)). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated precursor polymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the precursor polymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the precursor polymer of the carboxylic acid functional polymer of the composition of the present invention, under mild conditions, include those represented by the following general formula XI.

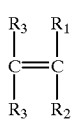

XI

In general formula XI, $R_1$ and $R_2$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_1$ and $R_2$ groups is an organo group while the other can be an organo group or hydrogen. For instance when one of $R_1$ or $R_2$ is an alkyl group, the other can be an alkyl, aryl, acyloxy, alkoxy, arenes, sulfur-containing alkyl group, or nitrogen-containing alkyl and/or nitrogen-containing aryl groups. The $R_3$ groups can be the same or different groups selected from hydrogen or lower alkyl selected such that the reaction between the terminal halogen of the polymer and the LRPEU compound is not prevented. Also an $R_3$ group can be joined to the $R_1$ and/or the $R_2$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between halogen terminated precursor polymer and LRPEU compound, e.g., alpha-methyl styrene, is summarized in the following general scheme 1.

General Scheme 1

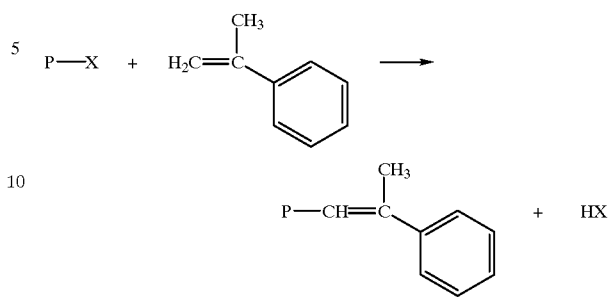

In general scheme 1, P—X represents the halogen terminated precursor polymer, which is later converted to the polycarboxylic acid functional polymer of the composition of the present invention, as described previously herein.

For each of general polymer structures IX and X, the subscripts r and s each independently have a value of 0 or more. Subscripts r and s each independently have a value of typically less than 100, preferably less than 50, and more preferably less than 10, for each of general polymer structures IX and X. The values of r and s may each range between any combination of these values, inclusive of the recited values.

The carboxylic acid functional polymer typically has a carboxylic acid equivalent weight of at least 100 grams/equivalent, and preferably at least 200 grams/equivalent. The carboxylic acid equivalent weight of the polymer is also typically less than 10,000 grams/equivalent, preferably less than 5,000 grams/equivalent, and more preferably less than 1,000 grams/equivalent. The carboxylic acid equivalent weight of the carboxylic acid functional polymer may range between any combination of these values, inclusive of the recited values.

The number average molecular weight (Mn) of the carboxylic acid functional polymer is typically at least 250, more typically at least 500, preferably at least 1,000, and more preferably at least 2,000. The carboxylic acid functional polymer also typically has a Mn of less than 16,000, preferably less than 10,000, and more preferably less than 5,000. The Mn of the carboxylic acid functional polymer may range between any combination of these values, inclusive of the recited values.

The carboxylic acid functional polymer may be used in the thermosetting composition of the present invention as a resinous binder or as an additive with a separate resinous binder, which may be prepared by ATRP or by conventional polymerization methods. When used as an additive, the carboxylic acid functional polymer as described herein typically has low functionality, e.g., it may be monofunctional, and a correspondingly high equivalent weight.

The carboxylic acid functional polymer (a) is typically present in the thermosetting composition of the present invention in an amount of at least 50 percent by weight, preferably at least 70 percent by weight, and more preferably at least 80 percent by weight, based on total weight of resin solids of the thermosetting composition. The thermosetting composition also typically contains carboxylic acid functional polymer present in an amount of less than 98 percent by weight, preferably less than 95 by weight, and more preferably less than 90 percent by weight, based on total weight of resin solids of the thermosetting composition. The carboxylic acid functional polymer may be present in the thermosetting composition of the present invention in an amount ranging between any combination of these values, inclusive of the recited values.

The thermosetting composition of the present invention may optionally further comprise a polycarboxylic acid functional polyester. Polycarboxylic acid functional polyesters useful in the composition of the present invention typically have an average of at least two carboxylic acid groups per polyester molecule. Polyesters having carboxylic acid functionality may be prepared by art-recognized methods, which include reacting carboxylic acids (or their anhydrides) having acid functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has carboxylic acid functionality and the desired molecular weight.

Examples of multifunctional carboxylic acids useful in preparing the polycarboxylic acid functional polyester include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids. Examples of polyols useful in preparing the polycarboxylic acid functional polyester include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, 2,2,4-trimethylpentane diol, and like polyols.

Polycarboxylic acid functional polyesters useful in the present invention typically have an Mn within the range of from 1,000 to 10,000, e.g., from 2,000 to 7,000. The acid equivalent weight of the carboxylic acid functional polyester is typically within the range of from 290 grams/equivalent to 3,000 grams/equivalent, e.g., from 500 to 2,000 grams/equivalent. When present in the thermosetting composition of the present invention, the polycarboxylic acid functional polyester is typically present in an amount of from 1 percent to 40 percent by weight, based on the total weight of resin solids, e.g., from 5 percent to 35 percent by weight, based on the total weight of resin solids.

The thermosetting composition comprises also one or more epoxide functional crosslinking agents having at least two epoxide groups. The epoxide functional crosslinking agent (b) is not prepared by ATRP methods, and is preferably solid at room temperature. Classes of epoxide functional crosslinking agents useful in the composition of the present invention include, but are not limited to, epoxide functional polyesters, epoxide functional polymers prepared by conventional free radical polymerization methods, epoxide functional polyethers, epoxide functional isocyanurates and mixtures thereof.

Epoxide functional polyesters useful in the present invention may be prepared by art-recognized methods. For example, the hydroxyl groups of a hydroxy functional polyester may be reacted with 1-halo-2,3-epoxy propane, e.g., epichlorohydrin, to form the epoxide functional polyester. Polyesters having hydroxy functionality may be prepared by traditional methods, which include reacting polyols having hydroxy functionalities of at least 2, and carboxylic acids (or their anhydrides) having acid functionalities of at least 2. As is known to those of ordinary skill in the art, the molar equivalents ratio of hydroxy groups to carboxylic acid groups of the reactants is selected such that the resulting polyester has hydroxy functionality and the desired molecular weight. Examples of multifunctional carboxylic acids and polyols useful in preparing the hydroxy functional polyester precursor of the epoxide functional polyester include, but are not limited to, those recited previously herein with regard to the optional polycarboxylic acid functional polyester.

The Mn of epoxide functional polyesters useful in the present invention is typically within the range of 1,000 to 10,000, e.g., from 2,000 to 7,000. The equivalent weight of the epoxide functional polyester is typically within the range of 290 to 3,000 grams/equivalent, e.g., 500 to 2,000 grams/equivalent.

Epoxide functional polymers prepared by conventional free radical polymerization methods that may be used as the epoxide functional crosslinking agent in the composition of the present invention are not prepared by ATRP. These epoxide functional polymer crosslinking agents are typically prepared by copolymerizing epoxide functional ethylenically unsaturated radically polymerizable monomer(s), typically a glycidyl functional (meth)acrylate, such as glycidyl (meth)acrylate, with ethylenically unsaturated radically polymerizable monomer(s) free of epoxide functionality, e.g., alkyl (meth)acrylates. Typically, the epoxide functional polymer prepared by conventional free radical polymerization methods is an epoxide functional acrylic polymer.

The conventional radical polymerization methods by which the epoxide functional polymer crosslinking agent is prepared typically involve the use of free radical initiators, such as organic peroxides and azo type compounds. Optionally, chain transfer agents may also be used, e.g., alpha-methyl styrene dimer and tertiary dodecyl mercaptan.

Examples of ethylenically unsaturated radically polymerizable monomers that may be used in the preparation of the epoxide functional polymer crosslinking agent include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Ethylenically unsaturated radically polymerizable monomer(s) free of epoxide functionality that may be used to prepare the epoxide functional polymer crosslinking agent include those recited previously herein with regard to the M and G residues of the polycarboxylic acid functional polymer prepared by ATRP.

The Mn of the epoxide functional polymer crosslinking agent prepared by conventional free radical polymerization methods is typically less than 10,000, e.g., between 1,000 and 5,000, and preferably between 1,000 and 2,500. The epoxide functional polymer crosslinking agent usually contains from 3 to 6 moles of epoxide functional ethylenically unsaturated monomer per kilogram of epoxide functional polymer crosslinking agent, e.g., between 3.1 and 5.1 moles of epoxide functional monomer per kilograms of epoxide functional polymer crosslinking agent.

Epoxide functional polyether crosslinking agents useful in the present invention may be prepared by art-recognized methods. For example, polyols having two or more hydroxy groups and polyepoxides having two or more epoxide groups are reacted in proportions such that the resulting polyether has epoxide functionality, as is known to those of ordinary skill in the art. The polyols and polyepoxides used in the preparation of the epoxide functional polyether may be selected from, for example, aliphatic, cycloaliphatic and aromatic polyols and polyepoxides, and mixtures thereof. Specific examples of polyols include those recited previously herein. Polyepoxides useful in preparing the epoxide functional polyether include those resulting from the reaction of a polyol and epichlorohydrin, as is known to those skilled in the art. In a preferred embodiment of the present invention, the epoxide functional polyether is prepared from 4,4'-isopropylidenediphenol and the diglycidyl ether of 4,4'-isopropylidenediphenol. An example of a commercially available epoxide functional polyether useful in the present invention is EPON® Resin 2002 from Shell Chemical Company.

The epoxide functional polyether crosslinking agent typically has a Mn of less than 10,000, e.g., between 1,000 and 7,000. The epoxide equivalent weight of the epoxide functional polyether crosslinking agent is typically less than 2,000 grams/equivalent, e.g., between 300 and 1,000 grams/equivalent.

Epoxide functional isocyanurates are known and may be prepared by art-recognized methods. A preferred epoxide functional isocyanurate is tris(2,3-epoxypropyl) isocyanurate.

The epoxide functional crosslinking agent (b) is typically present in the thermosetting composition of the present invention in an amount of at least 2 percent by weight, preferably at least 5 percent by weight, and more preferably at least 10 percent by weight, based on total weight of resin solids of the thermosetting composition. The thermosetting composition also typically contains epoxide functional crosslinking agent present in an amount of less than 50 percent by weight, preferably less than 30 by weight, and more preferably less than 20 percent by weight, based on total weight of resin solids of the thermosetting composition. The epoxide functional crosslinking agent may be present in the thermosetting composition of the present invention in an amount ranging between any combination of these values, inclusive of the recited values.

To achieve a suitable level of cure with the thermosetting composition of the present invention, the equivalent ratio of carboxylic acid equivalents is the polycarboxylic acid functional polymer (a) to epoxide equivalents in the epoxide functional crosslinking agent (b) is typically from 0.7:1 to 2:1, e.g., from 0.8:1 to 1.3:1. The above recited ranges of ratios are meant to also be inclusive of the carboxylic acid equivalents associated with any polycarboxylic acid functional polyester(s) that may optionally be present in the composition.

The thermosetting composition of the present invention may also include pigments and fillers. Examples of pigments include, but are not limited to, inorganic pigments, e.g., titanium dioxide and iron oxides, organic pigments, e.g., phthalocyanines, anthraquinones, quinacridones and thioindigos, and carbon blacks. Examples of fillers include, but are not limited to, silica, e.g., precipitated silicas, clay, and barium sulfate. When used in the composition of the present invention, pigments and fillers are typically present in amounts of from 0.1 percent to 70 percent by weight, based on the total weight of the thermosetting composition.

The thermosetting composition of the present invention may optionally contain additives such as waxes for flow and wetting, flow control agents, e.g., poly(2-ethylhexyl) acrylate, degassing additives such as benzoin, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of the thermosetting composition.

The thermosetting composition of the present invention is typically prepared by first dry blending the carboxylic acid functional polymer, the epoxide functional crosslinking agent and additives, such as flow control agents, decassing agents, antioxidants and UV absorbing agents, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C. The extrudate of the thermosetting composition of the present invention is cooled and, when used as a powder coating composition, is typically milled to an average particle size of from, for example, 15 to 30 microns.

In accordance with the present invention there is also provided, a method of coating a substrate comprising:

(a) applying to said substrate a thermosetting composition;

(b) coalescing said thermosetting composition to form a substantially continuous film; and (c) curing said thermosetting composition by the application of heat, wherein said thermosetting composition comprises a co-reactable solid, particulate mixture as previously described herein.

The thermosetting composition of the present invention may be applied to the substrate by any appropriate means that are known to those of ordinary skill in the art. Generally, the thermosetting composition is in the form of a dry powder and is applied by spray application. Alternatively, the powder can be slurried in a liquid medium such as water, and spray applied. Where the language "co-reactable solid, particulate mixture" is used in the specification and claims, the thermosetting composition can be in dry powder form or in the form of a slurry.

When the substrate is electrically conductive, the thermosetting composition is typically electrostatically applied. Electrostatic spray application generally involves drawing the thermosetting composition from a fluidized bed and propelling it through a corona field. The particles of the thermosetting composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 3 to 6 mils (75 to 150 microns).

Alternatively, when the substrate is not electrically conductive, for example as is the case with many plastic substrates, the substrate is typically preheated prior to application of the thermosetting composition. The preheated temperature of the substrate is equal to or greater than that of the melting point of the thermosetting composition, but less than its cure temperature. With spray application over preheated substrates, film builds of the thermosetting composition in excess of 6 mils (150 microns) can be achieved, e.g., 10 to 20 mils (254 to 508 microns). Substrates that may be coated by the method of the present invention include, for example, ferrous substrates, aluminum substrates, plastic substrates, e.g., sheet molding compound based plastics, and wood.

After application to the substrate, the thermosetting composition is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three dimensional crosslink network formed by covalent bond formation, e.g., between the epoxide groups of the crosslinking agent and the carboxylic acid groups of the polymer. The temperature at which the thermosetting composition of the present invention is cured is variable and depends in part on the amount of time during which curing is conducted. Typically, the thermosetting composition is cured at a temperature within the range of 149° C. to 204° C., e.g., from 1540 C to 177° C., for a period of 20 to 60 minutes.

In accordance with the present invention there is further provided, a multi-component composite coating composition comprising:

(a) a base coat deposited from a pigmented film-forming composition; and (b) a transparent top coat applied over said base coat, wherein said transparent top coat is deposited from a clear film-forming thermosetting composition comprising a co-reactable solid, particulate mixture as previously described herein. The multi-component composite coating composition as described herein is commonly referred to as a color-plus-clear coating composition.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, and polyurethanes.

The resinous binders for the pigmented film-forming base coat composition can be organic solvent-based materials such as those described in U.S. Pat. No. 4,220,679, note column 2 line 24 through column 4, line 40. Also, water-based coating compositions such as those described in U.S. Pat. Nos. 4,403,003, 4,147,679 and 5,071,904 can be used as the binder in the pigmented film-forming composition.

The pigmented film-forming base coat composition is colored and may also contain metallic pigments. Examples of suitable pigments can be found in U.S. Pat. Nos. 4,220,679, 4,403,003, 4,147,679 and 5,071,904.

Ingredients that may be optionally present in the pigmented film-forming base coat composition are those which are well known in the art of formulating surface coatings and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,769 and 5,071,904.

The pigmented film-forming base coat composition can be applied to the substrate by any of the conventional coating techniques such as brushing, spraying, dipping or flowing, but are most often applied by spraying. The usual spray techniques and equipment for air spraying, airless spray and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition on to the substrate, and prior to application of the transparent top coat, the base coat can be cured or alternatively dried. In drying the deposited base coat, organic solvent and/or water, is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat is applied over the deposited base coat by any of the methods by which powder coatings are known to be applied. Preferably the transparent top coat is applied by electrostatic spray application, as described previously herein. When the transparent top coat is applied over a deposited base coat that has been dried, the two coatings can be co-cured to form the multi-component composite coating composition of the present invention. Both the base coat and top coat are heated together to conjointly cure the two layers. Typically, curing conditions of 149° C. to 204° C. for a period of 20 to 30 minutes are employed. The transparent top coat typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

Synthesis Examples A and B

Synthesis Examples A and B describe the preparation of carboxylic acid functional acrylic polymers that are used in the powder coating compositions of Examples 1 and 2. The carboxylic acid functional polymer of Example A is a comparative polymer prepared by non-living radical polymerization. The carboxylic acid functional polymer of Example B is representative of a polymer useful in the thermosetting coating compositions of the present invention. The physical properties of the polymers of Examples A and B are summarized in Table 1.

In synthesis Examples A and B, the following monomer abbreviations are used: methyl methacrylate (MMA); n-butyl methacrylate (n-BMA); tertiary-butyl methacrylate (t-BMA); and methacrylic acid (MAA).

EXAMPLE A

A comparative carboxylic acid functional polymer was prepared by standard, i.e., non-controlled or non-living, radical polymerization from the ingredients enumerated in Table A.

TABLE A

| Ingredients | Parts by weight |
|---|---|
| Charge 1 | |
| toluene | 350 |
| initiator (a) | 40 |

TABLE A-continued

| Ingredients | Parts by weight |
|---|---|
| Charge 2 | |
| MMA | 100 |
| n-BMA | 350 |
| MAA | 50 |

(a) 2,2'-azobis(2-methylbutanenitrile) initiator, obtained commercially from E.I. du Pont de Nemours and Company.

Charge 1 was heated to reflux temperature (at about 115° C.) at atmospheric pressure under a nitrogen blanket in a 2 liter round bottom flask equipped with a rotary blade agitator, reflux condenser, thermometer and heating mantle coupled together in a feed-back loop through a temperature controller, nitrogen inlet port, and two addition ports. After holding Charge 1 for 30 minutes at reflux, Charge 2 was added over a period of 1 hour. With the completion of the addition of Charge 2, the contents of the flask were held at reflux for an additional 3 hours. The contents of the flask were then vacuum stripped. While still molten, the stripped contents of the flask were transferred to a suitable shallow open container and allowed to cool to room temperature and harden. The solidified resin was then broken into smaller pieces, which were transferred to a suitable closed container for storage.

EXAMPLE B

A carboxylic acid functional polymer useful in the thermosetting compositions of the present invention was prepared by atom transfer radical polymerization from the ingredients listed in Table B.

TABLE B

| Ingredients | Parts by weight |
|---|---|
| toluene | 350 |
| copper(II) bromide (b) | 2.0 |
| copper powder (c) | 2.2 |
| 2,2'-bypyridyl | 7.4 |
| diethyl-2-bromo-2-methylmalonate | 50.6 |
| MMA | 100 |
| n-BMA | 350 |
| t-BMA | 83 |

(b) The copper(II) bromide was in the form of flakes and was obtained from Aldrich Chemical Company.
(c) The copper powder had an average particle size of 25 microns, a density of 1 gram/cm$^3$, and was obtained commercially from OMG Americas.

The ingredients were all added to a 2 liter 4-necked flask equipped with a motor driven stainless steel stir blade, water cooled condenser, and a heating mantle and thermometer connected through a temperature feed-back control device. The contents of the flask were heated to and held at 85° C. for 4 hours. The contents of the flask were then cooled, filtered and the solvent was removed by means of vacuum stripping. To the stripped resin was added 350 ml of dioxane, and a 3 times molar excess (relative to the moles of t-BMA) of HCl (1 Molar in water). The resin, dioxane, HCl and water mixture was refluxed in a suitable round bottom flask for 4 hours. The contents of the flask were then cooled to room temperature and the pH was neutralized by the addition of sodium carbonate. The neutralized contents of the flask were filtered, and the water and dioxane were removed by vacuum distillation in a suitable flask. While still molten, the stripped contents of the flask were transferred to a suitable shallow open container and allowed to cool to room temperature and harden. The solidified resin was then broken into smaller pieces, which were transferred to a suitable closed container for storage.

TABLE 1

Physical Data of the
Polymers of Synthesis Examples A and B

| | Example A | Example B |
|---|---|---|
| Mn (d) | 3100 | 2840 |
| Mw (d) | 6045 | 3550 |
| PDI (e) | 1.95 | 1.25 |
| Tg onset (° C.) (f) | 28.3 | 39.9 |
| Tg midpoint (° C.) (f) | 45.4 | 54.8 |
| Tg endpoint (° C.) (f) | 62.3 | 69.6 |
| Melt Viscosity at 180° C. (poise) (g) | 572 | 112 |
| Acid Equivalent Weight (h) | 896 | 925 |
| Percent Weight Solids (i) | 99.8 | 99.9 |

(d) The molecular weight data was obtained by means of gel permeation chromatography using polystyrene standards. The abbreviations are summarized as follows: number average molecular weight (Mn); and weight average molecular weight (Mw).
(e) Polydispersity index (PDI) = (Mw/Mn).
(f) Glass transition temperature (Tg) onset, midpoint and endpoint values were determined by means of differential scanning calorimetry (DSC). The polymer samples underwent a stress release cycle followed by heating at a rate of 10° C./minute.
(g) Melt viscosity at 180° C. was determined using a Brookfield CAP 2000 High Temperature Viscometer.
(h) Acid equivalent weight was determined by titration with potassium hydroxide, and is shown in units of grams of resin / equivalent of acid.
(i) Percent weight solids, based on total weight was determined from 0.2 gram samples at 110° C. / 1 hour.

Powder Coating Composition Examples 1 and 2

Powder coating Example 2 is representative of a thermosetting coating composition according to the present invention, while powder coating Example 1 is a comparative thermosetting coating composition example. The powder coating compositions were prepared from the ingredients enumerated in Table 2.

TABLE 2

Powder Coating Compositions

| Ingredient | Example 1 | Example 2 |
|---|---|---|
| Polymer of Example A | 9 | 0 |
| Polymer of Example B | 0 | 9 |
| triglycidylisocyanurate crosslinker (j) | 1 | 1 |
| Flow Control Agent (k) | 0.3 | 0.3 |
| Benzoin | 0.1 | 0.1 |

(j) triglycidylisocyanurate (TGIC) crosslinker, commercially available from ACETO Agricultural Chemical Corporation.
(k) TROY 570 flow control agent, commercially available from Troy Corporation.

The ingredients listed in Table 2 were melt mixed by hand using a spatula on a hot plate at a temperature of 175° C. (347° F.). The melt-mixed compositions were then coarsely ground by hand using a mortar and pestle. The course particulate thermosetting coating compositions of Examples 1 and 2 were found to have 175° C. (347° F.) melt viscosities of 36 poise and 23 poise respectively. The melt viscosities were determined using a temperature controlled cone and plate viscometer manufactured by Research Equipment (London) Ltd. These results show that a thermosetting coating composition according to the present invention, i.e., Example 2, has a lower melt viscosity than that of a comparative thermosetting coating composition, i.e., Example 1.

The present invention has been described with reference to specific details of particular embodiments thereof. It is not intended that such details be regarded as limitations upon the scope of the invention except insofar as and to the extent that they are included in the accompanying claims.

We claim:

1. A method of coating a substrate comprising:
   (a) applying to said substrate a thermosetting composition;
   (b) coalescing said thermosetting composition to form a substantially continuous film; and
   (c) curing said thermosetting composition, wherein said thermosetting composition comprises a co-reactable solid, particulate mixture of:
      (i) polycarboxylic acid functional polymer prepared by atom transfer radical polymerization initiated in the presence of an initiator having at least one radically transferable group, and in which said polymer contains at least one of the following polymer chain structures:

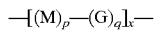

and

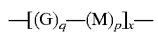

wherein M is a residue, that is free of carboxylic acid functionality, of at least one ethylenically unsaturated radically polymerizable monomer; G is a residue, that has carboxylic acid functionality, of at least one ethylenically unsaturated radically polymerizable monomer; p and q represent average numbers of residues occurring in a block of residues in each polymer chain structure; and p, q and x are each individually selected for each structure such that said polycarboxylic acid functional polymer has a number average molecular weight of at least 250; and
      (ii) epoxide functional crosslinking agent having at least two epoxide groups.

2. The method of claim 1 wherein said polycarboxylic acid functional polymer is selected from the group consisting of linear polymers, branched polymers, hyperbranched polymers, star polymers, graft polymers and mixtures thereof.

3. The method of claim 1 wherein said polycarboxylic acid functional polymer has a number average molecular weight of from 500 to 16,000, and a polydispersity index of less than 2.0.

4. The method of claim 1 wherein said initiator is selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

5. The method of claim 4 wherein said initiator is selected from the group consisting of halomethane, methylenedihalide, haloform, carbon tetrahalide, 1-halo-2,3-epoxypropane, p-methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(α-halo-$C_1$–$C_6$-alkyl)benzene, diethyl-2-halo-2-methyl malonate, ethyl 2-bromoisobutyrate and mixtures thereof.

6. The method of claim 1 wherein said polycarboxylic acid functional polymer has a carboxylic acid equivalent weight of from 100 to 10,000 grams/equivalent.

7. The method of claim 1 wherein M is derived from at least one of vinyl monomers, allylic monomers and olefins.

8. The method of claim 7 wherein M is derived from at least one of alkyl (meth)acrylates having from 1 to 20 carbon atoms in the alkyl group, vinyl aromatic monomers, vinyl halides, vinyl esters of carboxylic acids and olefins.

9. The method of claim 1 wherein G is derived from an alkyl (meth)acrylate, which after polymerization is hydrolyzed; or at least one hydroxy functional ethylenically unsaturated radically polymerizable monomer, which after polymerization is post-reacted with a cyclic anhydride.

10. The method of claim 9 wherein G is derived from a $C_1$–$C_4$ alkyl (meth)acrylate, which after polymerization is hydrolyzed; or at least one of hydroxyethyl (meth)acrylate and hydroxypropyl (meth)acrylate, which after polymerization is post-reacted with a cyclic anhydride.

11. The method of claim 1 wherein said polycarboxylic acid functional polymer (i) has at least one of the following polymer chain structures:

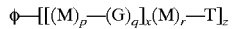

and

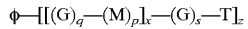

wherein φ is or is derived from the residue of said initiator free of said radically transferable group; T is or is derived from said radically transferable group of said initiator; x is independently from 1 to 100 for each structure; p and q are each independently within the range of 0 to 100 for each x-segment and for each structure, the sum of p and q being at least 1 for each x-segment, and q being at least 1 for at least one x-segment; r and s are each independently for each structure within the range of 0 to 100; z is independently for each structure at least 1; and said polycarboxylic acid functional polymer has a polydispersity index of less than 2.0.

12. The method of claim 11 wherein said polycarboxylic acid functional polymer has a number average molecular weight of from 500 to 16,000, and a polydispersity index of less than 1.8.

13. The method of claim 11 wherein p is independently selected for each structure within the range of 1 to 20; and q is independently selected for each structure within the range of 1 to 20.

14. The method of claim 11 wherein x is independently selected for each structure within the range of 1 to 50.

15. The method of claim 11 wherein T is halide.

16. The method of claim 15 wherein T is derived from a dehalogenation post-reaction.

17. The method of claim 16 wherein said dehalogenation post-reaction comprises contacting a precursor of said polycarboxylic acid functional polymer that is substantially free of carboxylic acid functionality with a limited radically polymerizable ethylenically unsaturated compound.

18. The method of claim 17 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

19. The method of claim 1 wherein said epoxide functional crosslinking agent (ii) is selected from the group consisting of epoxide functional polyesters, epoxide functional polymers prepared by conventional free radical polymerization methods, epoxide functional polyethers, epoxide functional isocyanurates and mixtures thereof.

20. The method of claim 19 wherein said epoxide functional crosslinking agent (ii) is tris(2,3-epoxypropyl) isocyanurate.

21. The method of claim 1 wherein the equivalent ratio of carboxylic acid equivalents in said polycarboxylic acid functional polymer (i) to epoxy equivalents in said epoxide functional crosslinking agent (ii) is within the range of 0.7:1 to 2:1.

22. The method of claim 1 wherein said polycarboxylic acid functional polymer (i) is present in said thermosetting composition in an amount of from 50 to 98 percent by weight, based on total resin solids weight, and said epoxide functional crosslinking agent (ii) is present in said thermosetting composition in an amount of from 2 to 50 percent by weight, based on total resin solids weight.

23. The method of claim 1 further comprising polycarboxylic acid functional polyester.

24. The method of claim 23 wherein said polycarboxylic acid functional polyester has a carboxylic acid equivalent weight of from 290 grams/equivalent to 3,000 grams/equivalent, and is present in said composition in an amount of from 1 percent by weight to 40 percent by weight, based on the total weight of resin solids.

* * * * *